United States Patent [19]

Fields

[11] 4,169,220
[45] Sep. 25, 1979

[54] TELEPHONE INSTRUMENT CONNECTION BLOCK WITH REMOTELY ACTUATED LINE TEST

[76] Inventor: Gary C. Fields, 3825 Delmont Ave., Oakland, Calif. 94605

[21] Appl. No.: 947,565

[22] Filed: Oct. 2, 1978

[51] Int. Cl.² .............................................. H04B 3/46
[52] U.S. Cl. .............................................. 179/175.3 R
[58] Field of Search ................ 179/175.3 R, 175.3 A, 179/175.3 F, 175.3 S, 175.31 R, 2 A; 324/95, 52; 340/167 A, 171, 172; 328/111

[56] References Cited

U.S. PATENT DOCUMENTS

| Re. 29,499 | 12/1977 | Spencer | 179/175.3 R |
|---|---|---|---|
| 3,636,280 | 1/1972 | Wetzel | 179/175.3 R |
| 3,725,613 | 4/1973 | Allen et al. | 179/175.3 R |
| 3,766,336 | 10/1973 | Wikholm | 179/175.3 R |
| 3,773,986 | 11/1973 | Tremblay | 179/175.3 R |
| 3,843,848 | 10/1974 | Cox | 179/175.3 R |
| 4,041,255 | 8/1977 | Cambridge et al. | 179/175.3 R |
| 4,054,759 | 10/1977 | McGrath et al. | 179/175.3 R |

*Primary Examiner*—Thomas A. Robinson
*Attorney, Agent, or Firm*—David B. Harrison

[57] ABSTRACT

A remotely actuated line testing connection block with modular jack is disclosed for installation and use to connect directly to a subscriber's telephone instrument. The block is connected to the incoming tip and ring wires of the line and to ground and provides tests which closely emulate those performed by a field repairman. When a test voltage of a first polarity from a central office is applied across one of the tip and ring wires and ground, a capacitor is charged. Upon release of the test voltage, the capacitor actuates a first switch which shorts the tip and ring wires together and may also ground them if a ground test option is selected. The capacitor also activates a second switch which disconnects the user's instrument. The first switch releases after about half of a test interval with the second switch releasing at the end thereof to restore normal line connections. In addition to, or in lieu of the first and second switches, the test block may include a test signal generator driven by a second capacitor charged from a test voltage of reversed polarity.

10 Claims, 3 Drawing Figures

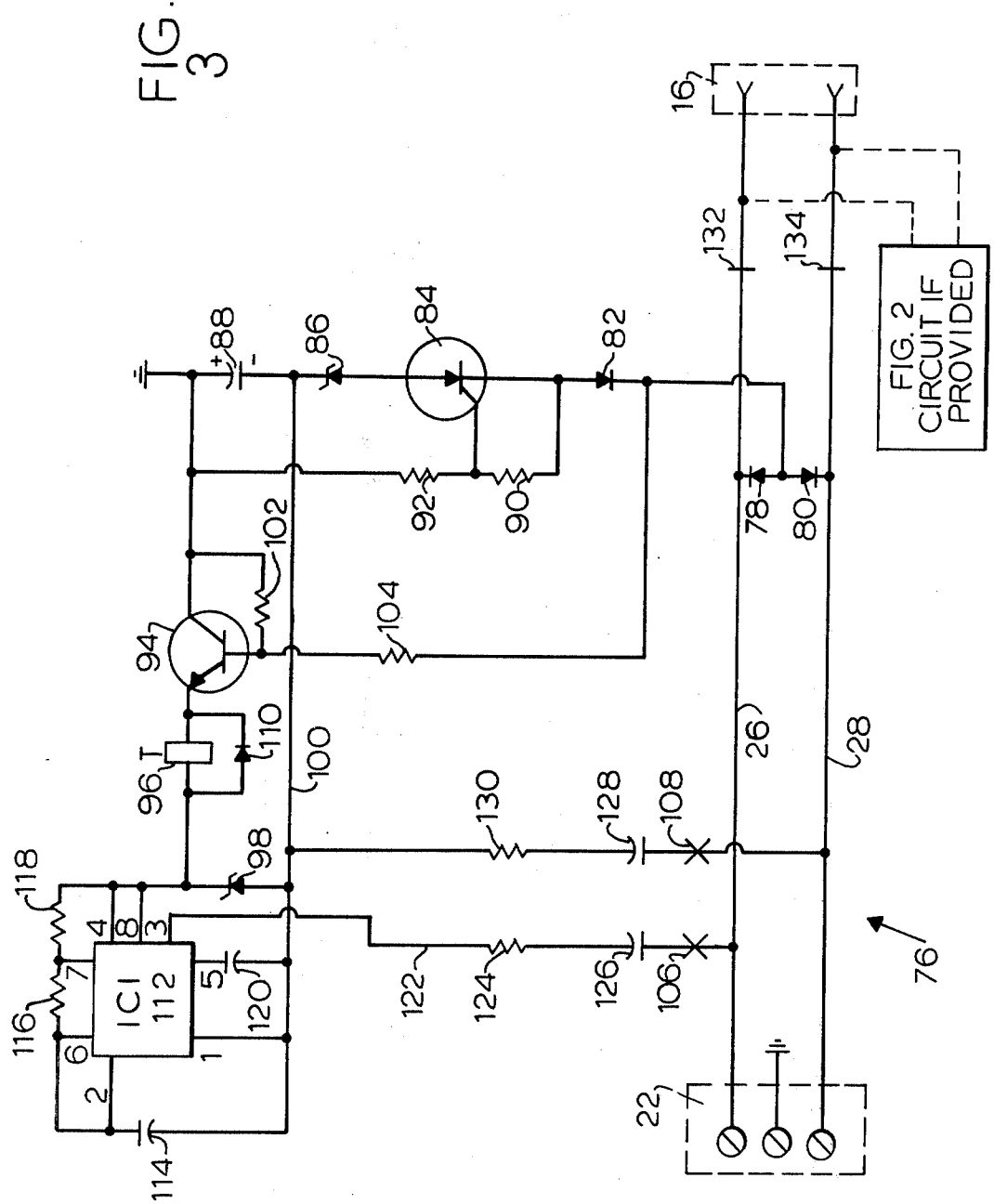

TELEPHONE INSTRUMENT CONNECTION BLOCK WITH REMOTELY ACTUATED LINE TEST

BACKGROUND OF THE INVENTION

The present invention relates to connection blocks for telephone instruments. More particularly, the present invention relates to improved telephone instrument connection blocks which provide finite test conditions and signals emulative of a field troubleshooter's tests in automatic response to signals sent from a central office test board.

Recent developments and trends in the telephone art have created a desire and need to minimize the use of field service men and troubleshooters. On one hand, the telephone utilities have relied increasingly upon telephone subscribers to pick up their telephone instruments from a centralized telephone service store and connect them for use at the home or office by plugging into permanently installed modular jacks. By relying upon the customer to make the field installation, the utilities have entirely eliminated the need to dispatch an installer, thereby realizing substantial savings in the cost of providing newly requested service. Nevertheless, customers have often misconnected the equipment with the result that expensive troubleshooters have still been dispatched for field testing to locate and correct such problems. Consequently, a need has arisen to be able to ascertain from a test board usually provided at the telephone company's switching equipment in a central office whether a faulty line condition results from a misconnected instrument or from a true defect in the line itself.

On the other hand, governmental regulatory agencies have become increasingly liberal in allowing telephone customers to purchase telephone instruments of widely varying makes and models on the open market and connect them directly to the telephone utility's lines by plugging into the permanently installed modular jacks. In such cases, the need has often arisen to be able to test the entire line before informing the customer that the instrument is either misconnected to or incompatible with the utility's lines or central office equipment.

In an attempt to meet the needs for remote disconnect, several proposals have been made to apply momentary test voltages to charge capacitors and actuate relays at the station protector of the customer service drop. Such prior devices were described in an article entitled "Subscriber Disconnect Units" appearing in the May 1, 1978 issue of *Telephone Engineer & Management* at pages 94–96. The units described in that article have a number of disadvantages and drawbacks overcome by the present invention. First, the units disconnected at the station protector of the customer service drop and failed to test the wiring inside the homes or office up to the point of the modular jack. Second, and perhaps of even greater significance, such prior art remote disconnect units did not provide a metallic short across the tip and ring wires during a first portion of a test interval, and an open condition during a second portion of the test interval. Third, such prior devices became actuated immediately upon application of the test voltage rather than waiting until all voltages were removed from the line undergoing test and it became quiescent which limited useful loop length of such devices.

Still another problem has remained unsolved by the prior art remote disconnect units. This problem is testing the quality of the line from the service instrument connection block to the central office. In specialized applications such as remote broadcast and data transmission, line quality has been a paramount consideration. And, even in routine subscriber voice circuits, line quality problems have arisen frequently.

A number of prior approaches are to be found in issued patents. U.S. Pat. No. 3,636,280 to Wetzel exemplifies many of the prior approaches taken to remote disconnect and testing. In Wetzel, a critical signal sent from the central office test board to the remote unit disconnected the customer's equipment and placed a known electrical impedance across the tip and ring wires of the line. A main drawback of the Wetzel contrivance was the complexity of testing equipment and operator skills required to measure the impedance placed across the line being tested. Another significant drawback was that only one test, line impedance, was provided. Loop resistances and line imbalances might well have gone undiscovered at the central office test board.

A variety of remote disconnect units are described in U.S. Pat. No. 3,725,613 to Allen et al, U.S. Pat. No. 3,773,986 to Tremblay, U.S. Pat. No. 4,041,255 to Cambridge et al, and U.S. Pat. No. 3,766,336 to Wikholm. In these patents various signals and circuits were proposed to disconnect the subscriber's equipment. However, the emulation of tests performed by the field troubleshooter and provided by the present invention were not capable of being provided by the remote disconnect units described in these patents.

Other remotely controlled line test devices are described in U.S. Pat. No. 3,739,107 (reissued under U.S. Pat. No. Re29,499) to Spencer, U.S. Pat. No. 4,054,759 to McGrath, U.S. Pat. No. 3,922,508 to Brady, U.S. Pat. No. 3,843,848 to Cox, U.S. Pat. No. 3,663,769 to Boatwright et al, and U.S. Pat. No. 3,790,723 to Stewart. Those devices functioned to provide test conditions and signals in response to remotely transmitted control signals, but are characterized as not only complex but also not particularly closely related to the present invention.

OBJECTS AND SUMMARY OF THE INVENTION

One object of the present invention is to provide a telephone instrument connection block incorporating remotely actuated line tests which overcomes the limitations and drawbacks of the prior art.

Another object of the present invention is to provide a telephone instrument connection block facilitating direct connection to the subscriber's telephone at the instrument, or at its servicing equipment in the cases of key telephone systems (KSU) and private branch exchanges (PBX) while providing remotely actuated line test conditions.

A further object of the present invention is to provide a telephone instrument connection block that disconnects a subscriber's instrument during a remotely actuated test interval, that provides a plurality of test conditions during the interval such as would be provided by a field troubleshooter, and that automatically restores normal service connection following the test interval.

Yet another object of the present invention is to provide a telephone instrument connection block with remotely actuated line test features which is elegantly umcomplicated in design, which is unhampered by extended periods of non-activation and yet may be activated with great reliability, which enables the subscriber to connect an instrument to the line without an installer, and which is inexpensive to manufacture and simple to install and connect.

These objects and other apparent advantages are realized by the telephone instrument connection block having remotely actuated line test functions of the present invention. The connection block of the present invention is installed at a telephone subscriber's instrument and is characterized by a first connection of the block to a tip and ring wire pair and to ground. A second connection, preferably a modular jack, is provided to connect to the cord of the telephone instrument. A first automatic switch is provided for interrupting a tip and ring wire circuit path between the first and second connections. A second automatic switch is provided to short the tip and ring wires together at the block. An energy storage device is connected between the tip and ring wires to ground and becomes charged when a test voltage is applied from the remote actuation point. When the test voltage is released, a third switch automatically applies the stored energy to the first and second switches which causes the subscriber's instrument to be disconnected during the entire test interval and the tip and ring wires to be shorted together during a portion thereof and optionally directly connected to ground as well. When the stored energy is consumed, the normal service connection condition is automatically restored and the block becomes invisible insofar as normal operation of the line is concerned.

Another aspect of the present invention is a remotely actuated test signal generator which sends a test signal over the line when a test voltage of reversed polarity has been remotely provided to a second energy storage device at the block. The test signal may be an audio tone burst of fixed or swept frequency, or it may be a data burst in pulse code modulation format.

Yet another aspect of the present invention is to test for proper grounding of the station lightning protection at the subscriber's location by actuating said block via a ground return test signal path.

Other objects, advantages and features of the present invention will become apparent from consideration of the following detailed description of preferred embodiments presented in conjunction with the accompanying drawings.

BRIEF DESCRIPTION OF THE DRAWINGS

In the drawings:

FIG. 3 is a schematic circuit diagram of one embodiment of a remotely actuated test generator forming another aspect of the connection block of the present invention.

DETAILED DESCRIPTION OF PREFERRED EMBODIMENTS

Figure 1:
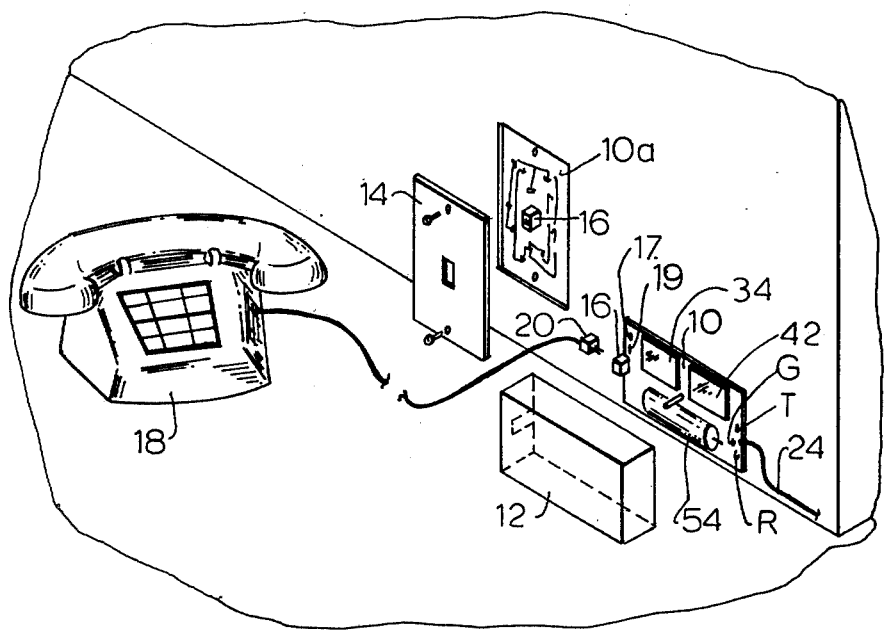
FIG. 1 depicts in an exploded diagrammatic perspective view, several modes of packaging and installation of the telephone instrument connection block of the present invention including a baseboard block and a recessed wall mount block.

Two telephone instrument connection blocks 10, 10a, each having remotely actuated line testing features in accordance with the present invention, are shown in FIG. 1. While blocks 10, 10a are equivalent electrically, they are configured in slightly different physical packages. The block 10 is intended to be mounted to a baseboard and shielded by an overlying cover 12, while the block 10a is a wall mount unit installed in a recessed service box and covered by a cover plate 14. A modular jack 16 is provided at one end of the baseboard block 10 and is centered in the wall mounted block 10a. A subscriber's telephone instrument 18 is provided with a modular plug 20 which mates with the jack 16. Additional wire terminals 17, 19 are provided in parallel with the tip (T) and ring (R) contacts of the jack 16. For blocks 10 connected for data communication, a level programming resistor 21 connected across additional contacts of the jack 16 is provided within the block 10. While the blocks 10, 10a are shown in relatively close proximity, it is to be understood that in usual installations only one or the other of the blocks 10, 10a would be utilized.

Figure 2:
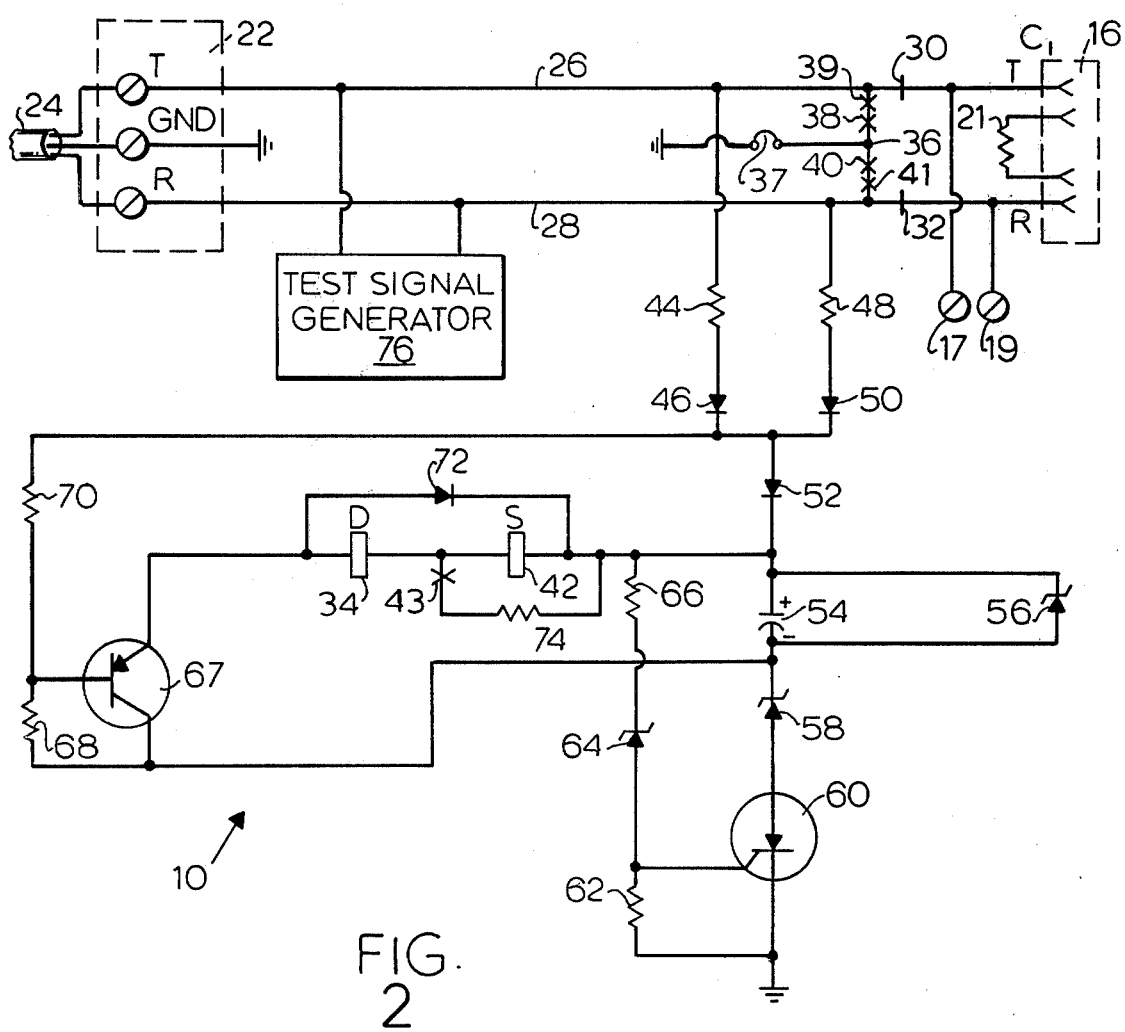
FIG. 2 is a schematic circuit diagram of the remotely actuated test circuitry of one embodiment of the connection block of the present invention.

FIG. 2 sets forth one aspect of the remotely actuated test circuitry of the connection block 10. Therein, an input terminal 22 includes binding posts enabling connection to tip (T), ring (R) and ground (GND) wires of a telephone line 24 which ultimately terminates in the telephone company's central office servicing the line.

Interconnecting wires 26, 28 connect tip and ring from the terminal 22 to the modular jack 16. The wires 26, 28 are each in series with normally closed relay contact pairs 30 and 32 of a relay 34. When the relay 34 operates, under conditions described hereinafter the wires 26, 28 are opened and the subscriber's equipment is thereupon disconnected from the line 24. Release of the relay 34 automatically reconnects the equipment to the line 24.

A wire 36 connected to ground via a jumper 37 is connected to both the tip and ring wires 26 and 28 through two pairs of normally open relay contacts, a first pair 38, 39 connecting to the wire 26 and a second pair 40, 41 connecting to the wire 28. Contacts 38 and 40 are closed upon operation of the relay 34 while contacts 39 and 41 are closed upon operation of a second relay 42. Another normally open contact 43 is in series with a resistor 74 which parallels the winding of the relay 42. The contact 43 is closed by operation of the relay 42 and then provides less voltage drop across the winding of the relay 42 so that it releases its contacts 39, 41, 43 sooner than the contacts 30, 32, 38 and 40 of the other relay 34 whose winding is in series with that of the relay 42. The importance of resistor 74 and series contact 43 will be discussed later. The contacts 38 and 40 provide a fail-safe backup to the contacts 39 and 41 by assuring that the path between the wires 26 and 28 will be unshorted even if the relay 42 fails to operate or the contacts 39 and 41 thereof weld or become stuck together for some reason such as an unexpected voltage surge. In the event that grounded pair testing is not desired, the jumper 37 is removed, or the connection to ground may be omitted entirely as may be the contacts 38 and 41, or 39 and 40. The circuitry for operating the relays 34 and 42 will now be described.

A resistor 44 and diode 46 are connected to the wire 26 between the terminal 22 and contact 30, and a resistor 48 and diode 50 are similarly connected to the wire 28. Another diode 52 has its anode connected to the parallel-connected cathodes of the diodes 46 and 50 and its cathode connected to an energy storage capacitor 54 such as a 1000 microfarad polarized electrolyte across which a 75 volt zener diode 56 is connected. The other side of the capacitor is connected to another zener diode, e.g., 47 volt, which is in turn connected to the anode of an SCR 60 having its cathode grounded, and its control element connected through a resistor 62 to ground and to the anode of another zener diode 64, e.g., 110 volts. The cathode of the diode 64 is connected through a resistor 66 to a common connection node of the diodes 52, 56 and the capacitor 54. The relay 42 is connected to this same node and the relay 34, in series with the relay 42, is connected to the emitter of a PNP transistor 67 having its collector connected to the node of the capacitor 54 and zener 58. The base of the transistor 67 is connected through a bias network including a resistor 68 to the collector and a resistor 70 to the node of the diodes 46, 50 and 52. A transient suppression diode 72 has its anode connected to the emitter of the transistor 67 and its cathode connected to the node of the diodes 52 and 56 and capacitor 54. A resistor 74 is provided in parallel across the relay coil 42. A test signal generator 76 is shown in FIG. 2 in connection with the wires 26 and 28. The circuitry and operation of one preferred embodiment of the test signal generator 76 is discussed below, in connection with FIG. 3.

The operation of the remotely actuated test circuit illustrated in FIG. 2 will now be described. A test voltage of approximately 130 volts DC is applied between ground and one of the tip and ring wires 26, 28 of the line to be tested from a voltage source located at the central office toll test board. The 130 volts is commonly available in such test boards as a coin collection or coin return control signal for pay telephones and is at a potential well above normal operating voltages of the line 24. At the block 10, the voltage applied to the tip or ring wires 26 or 28 is passed through one of the series pairs of resistor 44 and diode 46 or resistor 48 and diode 50 and thence through the diode 52 and into the capacitor 54 which becomes charged by virtue of its connection through the zener diode 58 and the SCR 60. During the application of the control voltage, the SCR 60 is in a conducting state by virtue of a bias voltage. This voltage is provided from the node of the diode 52 and capacitor 54 through the resistor 66 and zener diode 64 to the control element of the SCR 60. The diode 64, which conducts at approximately 110 volts triggers the SCR 60. The zener voltage of the diode 64 is high enough so that normal line voltages appearing on the tip and ring wires relative to ground do not close the SCR 60 and thereby cause the capacitor 54 to charge. The zener diode 58 conducts at approximately 47 volts which is present at the collector of the transistor 67. The resistance network of resistors 68 and 70 is fixed such that a cutoff voltage is applied to the base of the transistor 67 when the control voltage is present at the node of the diodes 46, 50 and 52.

When the control voltage is discontinued, the SCR 60 opens, and the transistor 67 then conducts and thereby operates the relays 34 and 42. The relays 34 and 42 remain closed while the capacitor 54 discharges. When a first predetermined voltage level is reached during discharge of the capacitor 54 the relay 42 releases and opens the contacts 39, 41 and 43 first because of the current dividing resistor 74 paralleled across the relay 42 by the contact 43. The voltage at which the relay 42 releases is a function of its coil resistance, its sensitivity, and the value of the resistor 74.

As the capacitor 54 continues to discharge, a lower voltage is reached at which the relay 34 releases which thereupon restores the connection of the wires 26 and 28 to the modular jack 16 at contacts 30 and 32. The diode 72 functions as a bucking diode to prevent reactive transients from the coils of the relays 34 and 42 from breaking down the junctions of the transistor 67.

The zener diode 56 functions to protect the capacitor 54 from charging beyond its nominal maximum voltage value. The characteristics of each of the relays 34 and 42 are typically as follows: 4900 ohm coil resistance, bifurcated gold-clad from 2C contacts, drop out voltage between 2 and 5 volts DC, closure voltage at 36 volts DC with a low profile printed circuit board mount package configuration. Such relays 34 and 42 are similar to relays manufactured by C. P. Clare, model No. 511B48A2C or Potter & Brumfield, Model No. T10-E2-Z2-48. Alternatively, relays with different release characteristics may be utilized for the relays 34, 42 with resultant elimination of the resistor 74 and contact 43.

Turning now to the schematic diagram of FIG. 3, one form of circuitry for the test signal generator 76 is illustrated therein as connected to the tip and ring wires 26 and 28 which are the same as those shown in FIG. 2 as extending from the incoming terminal block 22 to the modular jack 16. The test signal generator 76 illustrated in FIG. 3 has three basic sections, a power supply section, a switching section, and a generator section.

The power supply section includes diodes 78, 80, and 82, an SCR 84, a zener diode 86, and a storage capacitor 88. The diodes 78 and 80 connect a control voltage having a polarity reversed from that used to operate the FIG. 2 circuit between one of the tip and ring wires 26 and 28 and ground through one of the diodes 78, 80, the diode 82, the SCR 84, the zener diode 86, and the capacitor 88 which becomes charged. In the event that a positive (+130 V) coin collection voltage is applied as a control signal for the circuitry of FIG. 2, a negative (−130 V) coin return voltage of the same potential would be applied to operate the generator 76. In this way, both the line connection circuitry of FIG. 2 and the test signal generator of FIG. 3 may be utilized to provide test conditions and signals to the line at the subscriber's point of connection from control signals sent from the central office toll test board.

The switching section includes the control element of the SCR 84 which is biased to conduct in the presence of the reverse polarized control voltage by virtue of a resistance network including the resistors 90 and 92 connected as shown in FIG. 3. The switching section further comprises an NPN switching transistor 94 having its collector connected to ground and its emitter connected through the coil of a relay 96 and a zener diode 98 to a power supply node 100 at the cathode of the zener 86 and the negative element of the capacitor 88. The relay 96 may be of the same type as specified for the relays 34, 42.

The operation of the transistor 94 is very similar to the operation of the transistor 67 of the circuitry in FIG. 2. When a −130 volts coin return control voltage is applied between one of the tip and ring wires 26, 28 and ground, the capacitor 88 becomes charged. When the test voltage is removed from the line, the transistor 94 is turned on by virtue of a bias resistance network comprising resistors 102 and 104 in the base circuit thereof. When the transistor 94 conducts, the coil of the relay 96 is energized and functions to connect the generator 76 to the lines 26 and 28 by virtue of contact points 106 and 108 which are normally open. The diode 110 suppresses reactive transients of the coil 96 and protects the junctions of the transistor 94.

The generator section includes an integrated circuit tone generator 112, which may be a type 555 integrated circuit made by numerous manufacturers. The generator 112 is operated by power discharged from the capacitor 88 on the line 100. The frequency of oscillations of the oscillator 112 is fixed by the values selected for the capacitor 114 and resistors 116 and 118 connected as shown in FIG. 3. A bypass capacitor 120 decouples one of the inputs to the generator 112.

An audio test signal is put out from the generator 112 via a line 122 through an impedance matching resistor 124 and a DC blocking capacitor 126 to the tip wire 26 through the now closed contact 106. An audio test signal return path is provided from the ring wire 28 through the now closed contact 108, a DC blocking capacitor 128, and an impedance matching resistor 130 to the common power supply line 100. Tone is generated by the generator 112 and applied to the wires 26 and 28 until the capacitor 88 is discharged which is approximately five seconds whereupon the relay 96 releases and disconnects the generator 76 from the tip and ring wires 26, 28. Then, the circuit is inert, immune and invisible to normal operating voltages and conditions such as the −48 volt battery and twenty cycle ringing voltages present during normal telephone operation.

Other forms of test generators may be substituted in the place of the generator 112. For example, a generator made by National Semiconductor, part number LM566, may be configured as a voltage controlled oscillator to provide a sweep signal in the audio range to the lines 26 and 28, the sweep being directly related to the voltage of the capacitor 88 as it discharges. Another configuration within the scope of the present invention is the provision of a PCM digital burst generator which can be easily implemented by those skilled in the art with, e.g., CMOS circuitry to provide a serial data stream burst for testing lines that are utilized for, e.g., the transmission of data. Such a circuit might also be used to provide a unique data word for each connection block so that the central office test board would know by virtue of the data word the identity and location of the connecting block. Each such block would be programmed during installation and would find particular application in high reliability communications installations in which each line is routinely tested. Moreover, the data word might be selected to coincide with the subscriber's telephone number.

If disconnection of the subscriber's equipment is required or advantageous during the interval of alternating current (tone, pcm) testing; disconnect contacts 132, 134 may be provided in the wires 26, 28 respectively, as shown in FIG. 3, which are operated by the relay 96. It is to be understood that the tone generator 112 will cease oscillations before the relay 96 releases, so that tone is provided to the tip and ring wires 26, 28 during a first interval while disconnects of the customer's equipment at the jack 16 will be for a longer interval. In this way, tests may be performed with the tone and then without it, before the subscriber's equipment is automatically reconnected upon release of the relay 96.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A connection block for directly connecting a subscriber's telephone equipment to a subscriber terminal end of a telephone service loop, said block providing a plurality of remotely actuated test conditions in response to the application of a predetermined test voltage greater than normal telephone operating voltages at a central office terminal end of said service loop, said block comprising:

test voltage detection means for detecting the presence of said test voltage upon said loop and for thereupon switching said voltage to energy storage means in said block;

energy storage means connected through said test voltage detection means to said loop, for receiving and accumulating energy from said test voltage during the duration thereof;

first test condition provision means for disconnecting said subscriber's telephone equipment at said block during a test interval;

second test condition provision means for applying a test condition to said loop at said block during at least a portion of said interval;

control means connected to said test voltage detection means, said energy storage means, and said first and second test condition provision means, for connecting said energy storage means to said first and second condition provision means when said test voltage is removed from said loop, and for disconnecting said first and second condition provision means when said energy storage means becomes depleted thereby to restore normal loop conditions automatically.

2. The connection block set forth in claim 1 wherein said second test condition provision means comprises shorting means for shorting tip and ring wires of said loop together during a portion of said interval.

3. The connection block set forth in claim 2 wherein said second test condition provision means further comprises connecting means for connecting said shorted tip and ring wires to ground at said block.

4. The connection block set forth in claim 1 wherein said second test condition provision means comprises alternating current test signal generating means for generating a test signal which is applied to said loop at said block during said interval.

5. The connection block set forth in claim 4 wherein said alternating current test signal generating means comprises an audio tone generator for generating an audio tone as said test signal.

6. The connection block set forth in claim 4 wherein said alternating current test signal generating means comprises a digital pulse generator for generating a predetermined binary pulse string as said test signal.

7. A remotely actuated loop testing connection block for installation at the point of connection of a telephone subscriber's service instrument to a telephone line from a central office, said connection block comprising:

first connection means for connecting said block to a telephone service tip wire and ring wire pair, and to ground;

second connection means for connecting said instrument directly to said block;

a tip connection between said first and second connection means;

a ring connection between said first and second connection means;

first automatic switching means having a first predetermined operational interval for connecting said tip and ring connections directly together to provide a metallic shunt connection at said block upon operation thereof;

second automatic switching means having a second predetermined operation interval for disconnecting said second connection means from said tip and ring connections upon operation thereof;

energy storage means connected between said tip and ring connections and ground and responsive to a control voltage above a predetermined potential, for storing the charge of an electric signal greater than said potential sent to said block from a remote testing location via one of said service pair and ground to activate said block to provide loop testing, the charge stored in said energy storage means being directly related to said first and second operational intervals;

switching control means connected to said energy storage means and to said first and second automatic switching means for simultaneously starting operation of said first and second automatic switching means immediately following removal of said control voltage from said pair and ground, whereby operation of said first automatic switching means ceases after said first operational interval and operation of said second switching means ceases after said second operational interval and normal telephone operating connections are thereupon automatically restored to said instrument at said block.

8. A remotely actuated loop testing connection block for installation at the point of connection of a telephone subscriber's service instrument to a telephone line from a central office, said connection block comprising:

first connection means for connecting said block to a telephone service tip wire and ring wire pair, and to ground;

second connection means for connecting said instrument directly to said block;

a tip connection between said first and second connection means;

a ring connection between said first and second connection means;

first automatic switching means having a first predetermined operational interval for connecting said tip and ring connections directly together and to ground to provide a metallic shunt connection to ground at said block upon operation thereof;

second automatic switching means having a second predetermined operational interval for disconnecting said second connection means from said tip and ring connections upon operation thereof;

energy storage means connected between said tip and ring connections and ground and responsive to a control voltage above a predetermined potential, for storing the charge of an electric signal greater than said potential sent to said block from a remote testing location via one of said service pair and ground to activate said block to provide loop testing, the charge stored in said energy storage means being directly related to said first and second operation intervals;

switching control means connected to said energy storage means and to said first and second automatic switching means for simultaneously starting operation of said first and second automatic switching means immediately following removal of said control voltage from said pair and ground, whereby operation of said automatic switching means ceases after said first operational interval and operation of said second switching means ceases after said second operational interval, and normal telephone operating connections are thereupon automatically restored to said instrument at said block.

9. A remotely actuated loop testing connection block for installation at the point of connection of a telephone subscriber's service instrument, said connection block comprising:

first connection means for connecting said block to a telephone service tip and ring wire pair and to ground;

second connection means for connecting the cord of said instrument directly to said block;

a tip line connected between said first and second connection means;

a ring line connected between said first and second connection means;

switching means for opening said tip and ring lines upon operation thereof;

test signal generator means connected between said first connection means and said switching means for generating a predetermined alternating current test signal on said tip and ring lines upon operation thereof;

energy storage means connected to said pair and ground for storing the charge of an electrical test pulse sent to said block from a remote testing location via said service pair and ground to activate loop testing;

control means connected to said energy storage means, to said switching means and to said test signal generator means for operating said switching means and said test generator means during a test interval immediately following said test pulse, the duration of said interval being related to the magnitude of said test pulse and the capacity of said energy storage means.

10. A remotely actuated loop testing connection block for installation at the point of connection of a telephone subscriber's service instrument, said connection block comprising:

first connection means for connecting said block to a telephone service tip and ring wire pair and to ground;

second connection means for connecting said instrument directly to said block;

a tip line connected between said first and second connection means;

a ring line connected between said first and second connection means;

first switching means for connecting said tip and ring lines directly together to provide a metallic shunt connection at said block upon operation thereof;

second switching means for opening said tip and ring lines between said first switching means and said second connection means upon operation thereof;

test signal generator means connected between said first connection means and said second switching means for generating a predetermined alternating current test signal on said tip and ring lines upon operation thereof;

energy storage means connected to said pair and ground for storing energy from electrical test pulses sent to said block from a remote testing location via said pair and grounds to activate loop testing;

test control means connected to said energy storage means, said first and second switching means and to said test signal generator means, for operating said second switching means during each testing interval, for operating said first switching means during a subinterval of said interval in response to test pulses of a second character, each said interval commencing immediately following each test pulse and continuing for a duration related to the magnitude of the test pulse and the capacity of said energy storage device.

* * * * *